United States Patent

[11] 3,579,994

| [72] | Inventors | Paul Preus<br>Smith Road;<br>Charles E. Rosendahl, Flag Point, Toms River, N.J. 08753 |
|---|---|---|
| [21] | Appl. No. | 792,074 |
| [22] | Filed | Jan. 17, 1969 |
| [45] | Patented | May 25, 1971 |

[54] BARRIER FOR CONTROL OF SUBSTANCES IN BODIES OF WATER
3 Claims, 4 Drawing Figs.

| [52] | U.S. Cl. | 61/1 |
|---|---|---|
| [51] | Int. Cl. | E02b 15/04 |
| [50] | Field of Search | 61/1, 3, 5; 160/349 |

[56] References Cited

UNITED STATES PATENTS

| 2,240,567 | 5/1941 | Meacham et al. | 61/1 |
|---|---|---|---|
| 2,682,151 | 6/1954 | Simpson et al. | 61/1 |
| 2,817,850 | 12/1957 | Barbour et al. | 160/349X |

FOREIGN PATENTS

| 1,296,856 | 5/1962 | France | 61/1 |

*Primary Examiner*—Peter M. Caun
*Attorney*—John J. Gallagher

ABSTRACT: A barrier for control of waterborne substances having a plurality of units interconnected to one another in end to end relationship. Each unit has articulated flotation chambers and a flexible, depending skirt with permanent ballasting along the lower edge thereof. Means are provided to selectively reef the skirt and water ballasting pockets are formed on the skirt to provide restraint against wind action on the barrier.

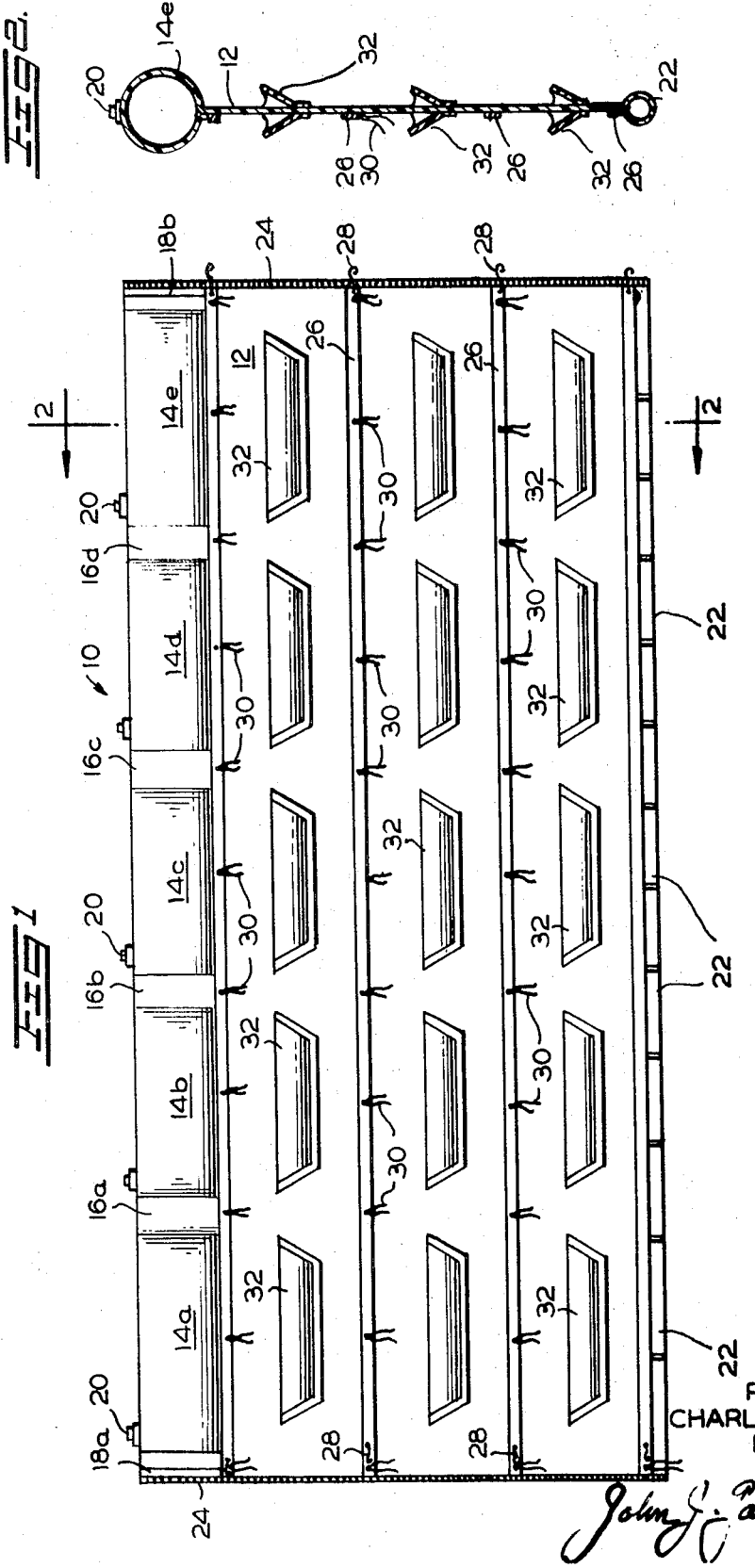

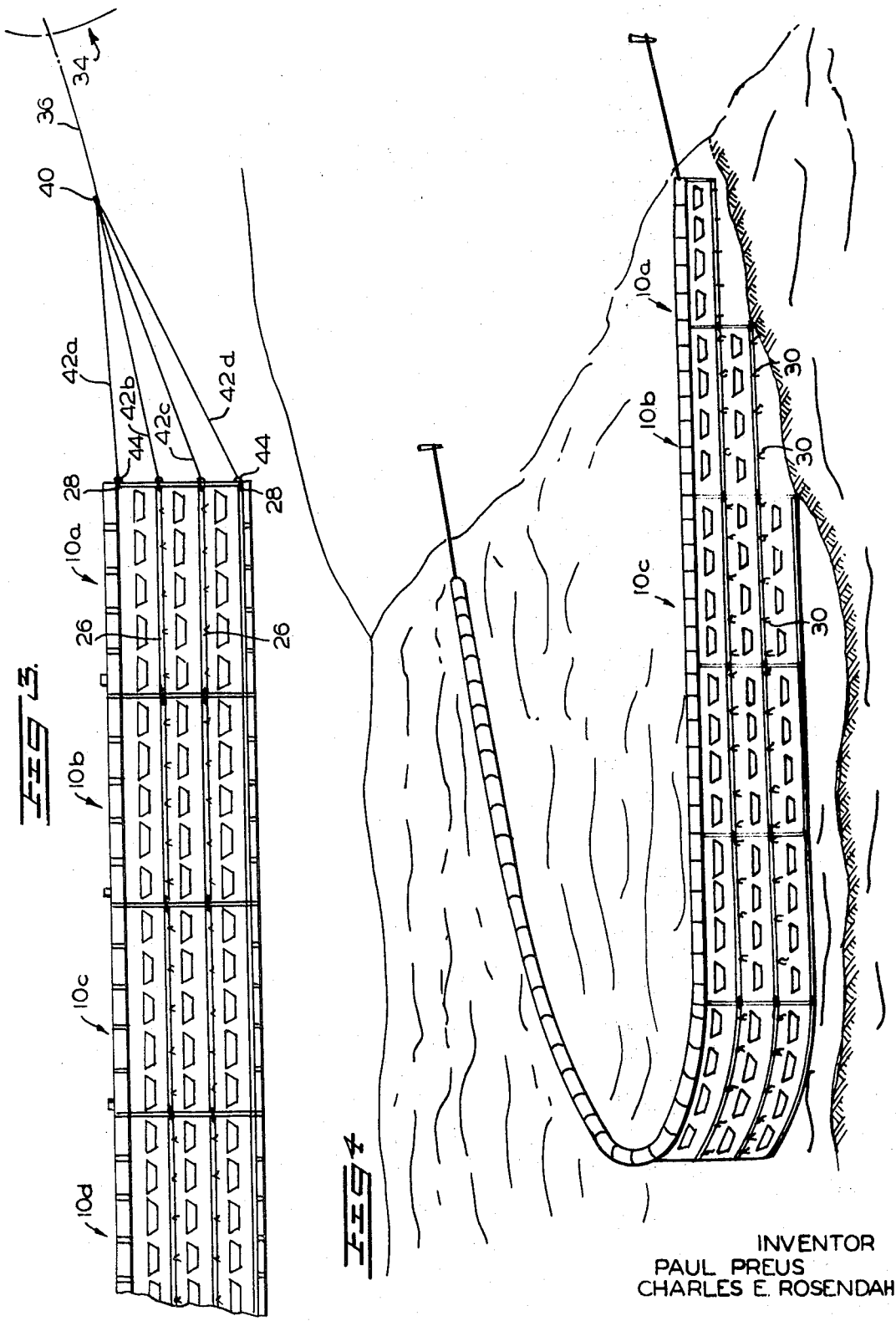

3,579,994

BARRIER FOR CONTROL OF SUBSTANCES IN BODIES OF WATER

BACKGROUND OF THE INVENTION

This invention relates generally to barriers for segregating areas in fluids and more particularly to inflatable barrier structures suitable for containing or excluding material or marine life in open bodies of water.

Although this invention finds particular use and is hereinafter described as applied to the containment of chemicals floating in bodies of water, it should be understood that the invention finds equal utility in forming floating barriers for many purposes such, for example, as filter screens to exclude foreign objects from water intakes, marine life control and the like.

A major hazard encountered in the storage, transportation and transfer of chemicals through or proximate bodies of water, is the danger of pollution of the water and surrounding land areas with leaking or dumped chemicals, known in the art as "water spills." Hazards such as this are of particular danger where the chemicals involved are petroleum or petroleum derivatives less dense than and immiscible in water. Because of the relative densities, the "spills" can be carried on the surface of water for great distances and, because of the immiscibility, the spilled liquids will not disperse or mix with the water to any great degree, thereby presenting a continuing pollution hazard to land masses considerable distances from the spill. Such spills can, therefore, cause damages in the millions of dollars.

Many attempts have been made, in the prior art, to provide devices to control, contain or remove oil spills of the type described. One such a device is the use of chemical additives such as emulsifiers which encase droplets of petroleum and render miscible in the supporting body of water to aid in the dispersion thereof. Such means is not suitable for large spills where the expense of adding such chemicals is too great or where the difficulty of applying the additive to the large surface areas is so great that chemical is ineffective. Furthermore, in many situations such as inland river and lake spills, city or industrial water intakes in the river will pick up the chemical mixtures, thereby creating serious health and fire hazards of sufficient degree to preclude the feasibility of chemical dispersants or wetting agents. Federal laws, in fact, prohibit the use of emulsifiers on spills involving heavy petroleum, such as residuals, bunker fuels and crude oil.

In situations where the size or location of the spill precludes the use of chemical dispersants, mechanical barriers, floating on the surface of the body of water, have found some degree of utility. Such mechanical means generally comprise a flotation member or interconnected flotation members which may be situated on the surface of the body of water around the spill to contain the spill and prevent its dispersal over wider areas and/or onto adjacent land masses. Such devices include rigid members such as wooden poles, floatable plastic rods or poles, elongated tanks or other hollow containers or inflatable collars or tubes often provided with ancillary means to preclude passage of petroleum floating on the surface. Such devices are generally arranged to encircle or otherwise confine the area to be isolated until the substance confined is pumped or otherwise removed from the confined area. Ancillary means for use with the flotation gear have included depending flexible skirts, rigid plates or boards disposed beneath the flotation gear, or, in certain cases, hay, straw or other similar absorbent matting substances.

Where rigid members are used in the mechanical barrier devices of the prior art, problems are encountered in that such structure requires large storage space, is heavy and unwieldy in transport and in deployment. These factors also render the barrier difficult to manage in unfavorable weather or sea conditions and barriers of this type have, therefore, been of little practical use in the past.

The inflatable barriers of the prior art have generally improved over the rigid type of barrier in that the inflatable character thereof lends readily to good storage properties and facility of handling and deployment. Prior art barriers have generally included an inflatable collar or elongated tube which has suitable flexibility to enable the structure to be warped around the area being enclosed. Certain prior art inflatable devices also have been provided with a flexible skirt depending therebeneath to preclude the passage of petroleum beneath the flotation structure.

For the most part, prior art inflatable devices of the type describe have been suitable for use in closed bodies of still water under relatively clam weather conditions. Inflatable devices have exhibited some flexibility for warping around areas to be enclosed; however, the resultant structure is and remains somewhat rigid so that in any type of sea condition the flotation structure cannot suitably follow the wave action. Inability of the structure to follow wave form causes the barrier to lift out of the water in the troughs between waves, thereby allowing petroleum on the surface of the water to escape beneath the structure. The prior art constructions and dimensional relationship of the flotation structure to the depending skirt have also proved them unsuitable for use in moderate weather conditions, particularly in the open sea, since the structure would be subjected to heavy wave action and skirt depth versus flotation diameter ratios much greater than those heretofore available required.

SUMMARY OF THE INVENTION

This invention provides a barrier for control of waterborne substances which avoids the disadvantages of the prior art by furnishing interconnecting units having an inflatable, articulated flotation means and a flexible skirt depending therefrom.

This invention also provides a barrier of the type described which is economically manufactured by furnishing a design which is fabricated essentially from a single sheet of heat-sealable material. The invention further provides a barrier of greater utility and availability than heretofore known by furnishing a low-pressure inflatable structure which, when deflated, is readily stored in a minimum of space and which can be deployed and retrieved with a minimum of effort.

The invention further still provides a barrier which can be utilized on the high seas under extreme weather conditions by furnishing an articulated skirted structure which provides adequate freeboard and kiting characteristics and also a suitable skirt depth to contain spill liquid under heavy sea conditions.

In a preferred embodiment, this invention furnishes a barrier unit for control of waterborne substances, comprising articulate inflatable flotation means, a flexible skirt depending from the flotation means, permanent ballast means proximate the lower edge of the skirt, connecting means at each edge of the skirt including tension absorbing members running lengthwise of the skirt, and water ballasting pockets formed on the skirt.

Other advantages and objects of this invention will become more apparent to those skilled in the art by reference to the following detailed description when viewed in light of the accompanying drawing wherein like numerals throughout the figures thereof indicate like components and wherein:

BRIEF DESCRIPTION OF THE DRAWING

FIG. 1 is an elevational view of a barrier unit in accordance with the invention;

FIG. 2 is a sectional view of the barrier of FIG. 1 taken along the line 2–2 thereof;

FIG. 3 is an elevational view of an assembly of the units of FIG. 1, under tow; and FIG. 4 is a perspective view of an assembly of the units of FIG. 1 emplaced in one of the uses therefor.

DESCRIPTION OF THE PREFERRED EMBODIMENT

In FIGS. 1 and 2, a barrier unit, generally indicated at 10, is illustrated, deployed and inflated for use. The unit comprises a skirt 12 and a plurality of flotation chambers 14a through 14e. The unit is formed with a hinge area 16a through 16d between each of the chambers 14a through 14e and a half hinge area 18a and 18b on the free ends of the chambers 14a and 14e. The unit can be formed of any flexible material desired, but is preferably formed of a material having at least a heat-sealable base such that the aforedescribed structure may be formed from a single sheet of material, at the required places to form independent chambers by turning over and sealing one edge longitudinally and then transversely heat-sealing the resultant tubular structure, as can be seen by reference to the FIGS. In lieu of a heat-sealable material, adhesive could obviously be used to accomplish similar results if so desired. At least the areas of the material forming the flotation chambers should also be air impervious, and when the unit is used for the control or containment of spills, the entire material should be impervious to liquids.

Each of the chambers 14a through 14e is provided with an inflation valve 20 which may be of any type common in the art such, for example, as a flapper valve or the like.

Skirt ballast chambers 22 are formed along the lower edge of the skirt 12, preferably formed by turning over and heat-sealing the lower edge thereof, as can be readily seen by reference to FIG. 2. The ballast chambers are filled with a suitable ballast material such, for example, as sand or the like, to provide means to properly deploy the skirt when the unit is in use. Obviously, other ballast means such, for example, as individual weights hung from the skirt, could be utilized for this purpose in lieu of, or in addition to, the ballast illustrated, if so desired. Slide fastener connectors 24 are attached to, or formed on, the ends of the skirt 12 to provide means to attach the unit 10 to like units for purposes to be described below. The slide fasteners may be of any type known in the art such, for example, as metal zippers or the interlocking continuous plastic slide fasteners now in common use. Where the unit is to be utilized for control or containment of spills, the fastener should be impervious to liquids and have suitable mechanical strength to withstand stresses imposed by hydrostatic pressure and dynamic forces imposed by wave motion.

Obviously, other types of connectors, such as hook and eye or snap connectors used in conjunction with overlapping seals can be utilized for this purpose if so desired.

In order to provide sufficient mechanical strength for the unit 10 in the longitudinal direction, the skirt 12 is provided with a series of longitudinally extending tension absorbing tapes 26, heat-sealed, or otherwise attached to one face thereof. The tapes may be formed of any nonrigid, constant length material having suitable mechanical strength such, for example, as prestressed nylon fabric tape or the like. The ends of the tapes 26 are free from the skirt 12 and are furnished with a connector 28, such, for example, as a "calf chain" hook or the like. The combined length of the tape 26 and the connectors 28 is less than the effective length of the skirt 12 for purposes to be described below.

For purposes of reefing the skirt to depths less than the full depth thereof, ties 30 are attached thereto at suitable intervals for shortening the skirt in a manner known in the marine art.

A plurality of self-filling, self-bailing pockets 32 are formed on the skirt 12, preferably by heat-sealing material thereto, to provide means to increase the ballasting of the skirt under conditions which will be explained below.

The relative dimensions of the aforedescribed unit are of importance to the invention in that the unit is particularly suited for controlling spills on the high seas under most weather conditions and is, furthermore, adapted for handling with a minimum of difficulty. The unit is also particularly suited for compact storage, thereby increasing its availability and utility. In order to achieve these results, the unit must be able to conform to wave action in relatively heavy seas and high wind conditions without losing containment of the spill either over or under the unit. In order to accomplish this, the flotation chambers must have enough buoyancy and shape to provide sufficient freeboard and "kiting" characteristics to contain either wave-carried or airborne spill fluids. For these purposes it has been found that a flotation chamber between 2 and 5 feet, preferably 3 feet in diameter is required for the purposes of this invention. For purposes of ease and economy of manufacture, the generally cylindrical flotation chamber illustrated is preferred, however, if found desirable, other cross-sectional configurations may be utilized for the chambers without exceeding the scope of this invention.

The lengths of the chambers 14a through 14e, the hinges 16a through 16d and the half hinges 18a and 18d are important in several respects. One function of the individual chambers is to provide watertight integrity in the unit flotation to insure continued flotation in the event of puncture of one or more of the chambers. The chambers must, therefore, have suitable flotation capability to support the structure in the event of loss of buoyancy of adjacent chambers.

The flotation means provided by the chambers must also be sufficiently articulate to follow wave motion, in even the heaviest of seas, to preclude the lifting of the skirt 12 in troughs between waves and the possible loss of spill fluid past the barrier. The unit must also be sufficiently articulate to provide for deployment and folding for storage with a minimum of effort. For these purposes, it has been found that design according to the following table is desirable:

|  | Minimum | Preferred | Maximum |
| --- | --- | --- | --- |
| Length of chambers 14a-14e, feet | 3 | 5 | 8 |
| Length of unit 10, feet | 30 | 50 | 150 |
| Length of hinges 16, inches | 3 | 10 | 15 |
| Depth of skirt 12, feet | 8 | 16 | 25 |

The minimum dimensions of the length of unit 10 and depth of skirt 12 are generally dictated by functional requirements, such as articulation, flotation and spill containing capability while the maximum dimensions are dictated by convenient handling requirements. Within the above limitations, to provide safe watertight integrity and suitable articulation, the number of chambers should be no less than three in 50 feet of unit length. The weight in the ballast chambers 22 serves primarily to suitably maintain deployment of the skirt 12 in a generally vertical configuration against wave action and currents which tend to displace the skirt horizontally.

Under certain wind conditions, aerodynamic forces will produce lift on the chambers 14, which, when lifted from the water, will allow "kiting" of the barrier. To a certain degree, such kiting is beneficial in that the freeboard of the barrier is increased and prevents escape of wave or airborne spill liquid attendant with the high winds. Such kiting, however, must be controlled, or the barrier can become completely airborne at times. Such control can be provided by furnishing added weight to the unit or by killing a portion of the lift produced on the flotation chambers 14 by means well known in the art, such, for example, as spoilers, or the like.

The pockets 32 provide means to increase the weight of the unit 10 during kiting without entailing a permanent weight increase in the structure. When kiting occurs, the skirt 12 moves in a vertical direction, thereby filling the pockets 32 with water. As each pocket is lifted from the water, the effective weight of the unit 10 is increased by the amount of the weight of the unit 10 is increased by the amount of the weight of the water contained in the pocket. It has been found that pockets between 2 and 3 feet in length and 6 and 7 inches in height will provide suitable addition weight for the purposes of the invention. Obviously, the pockets can be continuous rather than individual, as illustrated, if so desired. Other means, such as partial flooding of the chambers 14 can also be utilized to increase the weight of the unit 10 if required.

Referring now to FIG. 3 of the drawings, a plurality of units 10a through 10d are illustrated connected together to form a portion of a barrier and under tow by a vessel 34 through a tow line 36 and bridle, indicated generally at 38. The bridle comprises a tow lines connecting swivel 40, bridle lines 42a through 42d and unit connecting swivels 44. The swivels 44 are connected to the connectors 28 at the free end of each of the tapes 26 on the skirt 12 in such a manner that each of the bridle lines 42a through 42d transmits tension through the tape attached thereto. Due to the shorter effective length of the tapes 26 as compared to the skirts 12, all of the tension for towing the barrier is transmitted through the tapes thereby limiting the tensional forces imposed on the units themselves. The bridle 38 should be arranged so that the towing forces applied equally across the depth of the barrier predominantly by selecting the lengths of the bridle lines 42a through 42d such that the angle of pull on each of the tapes 26 is minimal. A bridle approximately 35 feet in length has been found suitable for the purposes of the invention.

The swivel connections provided by the invention preclude transmission of torsional forces which would tend to twist the barrier.

Referring now to FIG. 4, one of the uses for the ties 30 is illustrated. Where the barrier system is to be used proximate a sloping bottom, such as along the shore, the individual units 10a and 10b may be reefed into various degrees as illustrated to accommodate the sloping characteristics of the bottom, if desired.

In the configuration illustrated in FIG. 4, the barrier is anchored to the beach where it can serve to contain a spill for removal by pumps or to surround a grounded casualty and contain a spill resulting from the casualty or guard against a potential spill resulting from wave or wind action on the vessel.

In operation, the 10 units are stored in a deflated condition, preferably folded transversely at each hinge 16 and longitudinally at at least each of the intermediate tapes 26. The towing bridle 38 is then attached to one end of the first unit 10a and the chambers 14a through 14e thereof are inflated by a source of low-pressure air (not shown) through the valves 20. The chambers are preferably inflated in sequence, while the unit is being paid out into the water. Pressure from sources such as commercial vacuum cleaners have been found suitable for the purposes of the invention. Upon inflation of the first unit, the second unit 10b is connected to the free end of the unit 10a by means of the fastener means 24 and the adjacent connectors 28 of the respective units are connected. The unit 10b is then inflated and paid out as described above for the unit 10a. The above procedure is then repeated for as many units as required for the particular job for which the barrier is to be put to use. Where the barrier is to surround a vessel or spill source, the free ends of the first and last units are connected after the barrier is deployed around the ship. Suitable moorings, fenders and the like structures can be provided to maintain the position of the barrier and/or to fend the barrier from the vessel as required.

It is contemplated that marine degreasers may be used in conjunction with this invention in the area of the barrier, to aid in controlling spills contained within the barrier.

Obviously, the units of this invention may be modified for uses other than as specifically described. The skirt 12, for example, may be formed of net or pervious material and used to confine or exclude marine life from areas such as bathing beaches, marine farms, fish trapping or the like. Such a unit can find utility in providing movable or temporary filtering means for municipal or industrial water inlets.

What has been set forth above is intended primarily as exemplary to enable those skilled in the art in the practice of the invention. It should therefore be understood that, within the scope of the appended claims, the invention may be practiced other than as specifically described.

What is new and therefore desired to be protected by Letters Patent of the United States is:

We claim:

1. A barrier for control of substances in a body of water having a plurality of units, each unit comprising:

articulate flotation means including a plurality of inflatable chambers, and means hingedly interconnecting said chambers in end-to-end relationship, valve means communicating with each of said chambers to provide for individual inflation and deflation thereof;

a continuous skirt coextensive with and depending from said flotation means, ballasting means including a plurality of vertically oriented, open pockets distributed over the surface of said skirt; and connecting means on each end of said unit providing for attachment thereof to adjacent units to form a continuous barrier therewith.

2. A barrier unit in accordance with claim 1 wherein said means hingedly interconnecting said chambers are at least about 10 percent of the length of said chambers.

3. A barrier unit in accordance with claim 1 wherein said ballasting means further includes ballast material encased in closed pockets proximate the lower edge of said skirt.